Oct. 4, 1966

E. J. TESTA 3,276,293

PILOTS FOR COUNTERBORE CUTTERS

Filed April 27, 1965

INVENTOR.
ERNEST J. TESTA
BY
Ernest J. Testa

United States Patent Office 3,276,293
Patented Oct. 4, 1966

3,276,293
PILOTS FOR COUNTERBORE CUTTERS
Ernest J. Testa, Santa Fe Springs, Calif., assignor to Tesan Tool Manufacturing Company, Santa Fe Springs, Calif.
Filed Apr. 27, 1965, Ser. No. 451,237
4 Claims. (Cl. 77—58)

This invention relates to improvements in detachably mounted pilots for counterbore cutters of the type commonly used in machine shops for counterboring holes. This invention has for an object the provision of a shank having a flared end, or head, which shank may receive a bushing having a slip fit to the shank, allowing the bushing to rotate freely on the shank; and a washer also having a slip fit to the shank, and which washer serves as a thrust bearing.

Heretofore, pilots commonly used are made as one single solid piece consisting of a round shank with a round head. The shanks are made in various different diameter sizes, each to fit a counterbore cutter with a corresponding size hole. In the prior art, the pilot shank is inserted into the central hole of the counterbore cutter and is fastened by means of a set screw in the counterbore cutter tightening against a flat on the pilot shank. This one-piece pilot is made in many different combinations of pilot diameters, with a given shank diameter. For example, a ¼ inch diameter shank may have either a 5/16, 3/8, 7/16, ½, 9/16, 5/8, 11/16, or ¾ inch, and so forth, pilot diameter; or, a 3/8 inch diameter shank may have either a 7/16, ½, 9/16, 5/8 inch, and so on, pilot diameter. In the prior art pilots there are approximately eight different shank diameters ranging from 3/32 through ½ inch which are generally accepted as being standard in the industry. There are approximately 93 different pilot diameters, ranging from ⅛ inch through 3 inches, generally accepted as standards in the industry. Since each of the shank diameters are made with several different pilot diameters, there are approximately one hundred eighty different combinations of counterbore pilots sizes generally accepted as standard in the industry. This prior art results in the disadvantage of a machine shop having to maintain a large inventory of pilots to cover a range of sizes.

Another serious disadvantage of the prior art is that many times, during the operation of counterboring a hole with a counterbore cutter and the one-piece pilot, the pilot will bind severely in the hole, for various reasons, thereby restricting the pilot from rotating in harmony with the cutter. This transfers a severe twisting action to the pilot shank which is restricted by the cutter's locking set screw against said shank. The result is a damaged or broken pilot, which often results also in a damaged or broken counterbore cutter which may, in turn, cause a damaged or scrapped workpiece that was being counterbored. Also, in many cases, this severe twisting action results in a severe strain against the locking set screw so that it becomes impossible to loosen the screw with the ordinary hex wrench key. It then becomes necessary to drill out the screw. This damage and breakage results in expensive tool replacement, damaged or scrapped workpieces, and costly down time.

It is, accordingly, an object of this invention to provide a counterbore pilot that will fit into counterbore cutters and be held by set screw means in the same manner as in the prior art, but incorporating a freely rotatable bushing which serves as the pilot and is detachably mounted to the fixed shank.

A further object of the invention is the provision of a washer, or thrust bearing, that protects the cutting edges of the counterbore cutter.

A still further object of the invention is to provide shanks in the several standard diameter sizes, and to provide, separately, pilot bushings of different outside diameters so that many different combinations can be quickly assembled to any single given shank, thus reducing pilot inventory costs, since it is cheaper to manufacture a single bushing and a single shank than it is to manufacture the prior art one-piece type. Also, bushings made of nylon, aluminum or other materials, besides the usual hardened steel, can be used, if desired.

Further objects and advantages of the invention will be apparent by the following description of the accompanying drawing, wherein.

Figure 1:
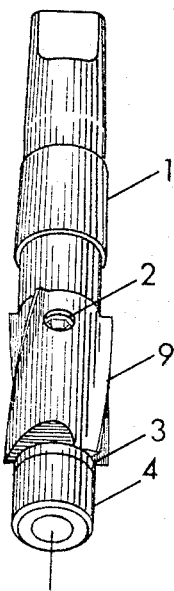
FIG. 1 is a perspective view showing the rotatable pilot detachably mounted to a standard type of counterbore cutter.
Figure 2:
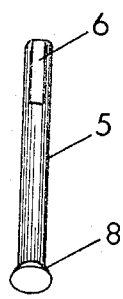
FIG. 2 is a perspective view of the pilot shank.
Figure 3:
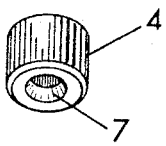
FIG. 3 is a perspective view of the bushing which serves as a pilot.
Figure 4:
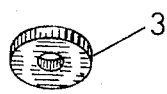
FIG. 4 is a perspective view of the washer which serves as a thrust bearing.

With further reference to the drawing:

There is shown a standard type of counterbore cutter 1 with its flute section 9 having a round bore centrally located through its length. A set screw 2, contained through the wall of the flute section, enters at right angle into the centrally located bore. Bushing 4 is cylindrical in shape, having a smooth, round bore centrally located through its center concentric to the outside diameter. One end of the bore is in the form of a countersink or chamfer 7; that is to say that the bore terminates in an angle extending from the bore to the end face of the bushing. Shank 5 is cylindrical in shape having a diameter that provides a close slip fit to the bore in bushing 4; and the bore in counterbore cutter 1. One end of shank 5 is in the form of a round flared head 8 which extends as an angle outwards from the shank, terminating in a somewhat larger diameter than the shank portion thereof. The flared head 8 is of an angle and diameter that is equal to the angle and diameter of countersink 7 in bushing 4. One side of the shank 5 has a flat 6 extending from the end opposite the head end for a length that is proximate to the flared head end. Washer 3 is cylindrical and flat in shape with a central round bore through it and concentric to the outside diameter. The diameter of the bore, in washer 3, is such that a slip fit is provided to the diameter of the shank 5. The outside diameter of washer 3 is somewhat smaller than the outside diameter of bushing 4.

In use, shank 5 is slipped through the hole in bushing 4 with countersink 7 adjacent to, and stopped by, flared head 8 and the shank 5 is then slipped through the hole in washer 3. The shank 5 is then slipped into the hole in counterbore cutter 1 and set screw 2 is tightened against shank flat 6. In this assembly, washer 3 is adjacent to the cutting ends of flutes 9. Consequently, in this assembly, shank 5 is non-rotatable within the counterbore cutter hole becauses of the restrictive force of set screws 2, but the bushing 4 and washer 3 are free to rotate on shank 5.

Thus, during use in a counterboring operation on a workpiece, if the bushing pilot 4 becomes restricted from rotating in harmony with the counterbore cutter 1 because of chips, or a tight hole in the workpiece, the shank 5 is free to rotate in harmony with the counterbore cutter 1 and so preventing any damage which might otherwise occur. Also, washer 3 is free to rotate as a thrust bearing in harmony with the counterbore cutter 1, thereby protecting the cutting ends of flutes 9.

It will be apparent to those skilled in the art that various changes may be made in the invention without departing from the scope and spirit of the invention,

What is claimed is:

1. A pilot detachably mounted to counterbore cutters, said pilot comprising a shank to which is rotatably, detachably mounted a bushing pilot and also to which is rotatably detachably mounted a thrust bearing washer.

2. A pilot according to claim 1 characterized in that the shank is cylindrical in shape, having a cylindrical flared or tapered head that is larger in diameter than said shank portion, said shank portion having a flat surface on one side extending from the end opposite the said flared or tapered head end and proximate to the said head end.

3. A pilot according to claim 1, characterized in that the bushing pilot is cylindrical in shape and having a central round hole therethrough, forming a slip rotatable fit on the shank portion of the pilot, said bushing pilot having one end of the said central round hole terminating in the form of a bevel, chamfer or countersink, said countersink forming a mating fit to the tapered head end of said shank.

4. A pilot according to claim 1, characterized in that the thrust bearing washer is cylindrical and flat in shape having a central hole therethrough forming a slip rotatable fit on the shank portion of the pilot, said thrust bearing washer having an outside diameter somewhat smaller than the outside diameter of the bushing portion of the pilot.

References Cited by the Examiner

UNITED STATES PATENTS

| | | |
|---|---|---|
| 897,041 | 8/1908 | Weller. |
| 1,724,005 | 8/1929 | Christensen. |
| 2,009,168 | 7/1935 | Dettmer. |

WILLIAM W. DYER, Jr., *Primary Examiner.*

G. A. DOST, *Assistant Examiner.*